(12) United States Patent
Tsukihashi

(10) Patent No.: US 6,430,127 B1
(45) Date of Patent: Aug. 6, 2002

(54) DISK PLAYER FOR PERFORMING DATA REPRODUCTION RECORDED ON A DISK

(75) Inventor: Akira Tsukihashi, Gunma (JP)

(73) Assignee: Sanyo Electric Co., Ltd., Osaka (JP)

(*) Notice: Subject to any disclaimer, the term of this patent is extended or adjusted under 35 U.S.C. 154(b) by 0 days.

(21) Appl. No.: 09/282,336

(22) Filed: Mar. 31, 1999

(30) Foreign Application Priority Data

Apr. 7, 1998 (JP) .......................................... 10-094570

(51) Int. Cl.[7] ................................................. G11B 7/00
(52) U.S. Cl. ............................... 369/47.33; 369/47.36; 369/47.38; 369/47.44
(58) Field of Search .......................... 369/47.29, 47.3, 369/47.31, 47.32, 47.33, 47.34, 47.42, 47.44, 47.36, 47.38

(56) References Cited

U.S. PATENT DOCUMENTS 5,822,288 A * 10/1998 Shinada ....................... 369/54
6,115,337 A * 9/2000 Takagi et al. ................ 369/54
6,130,869 A * 10/2000 Tokoro et al. ............... 369/54

FOREIGN PATENT DOCUMENTS

| JP | 05-258460 | | 10/1993 | | |
| JP | 06-096520 | | 4/1994 | | |
| JP | 9-198851 | * | 7/1997 | ........... | 369/54 |

* cited by examiner

Primary Examiner—Nabil Hindi
(74) Attorney, Agent, or Firm—Hogan & Hartson, L.L.P.

(57) ABSTRACT

Read data is given reproduction processing, including data correction, in synchronism with a bit clock. A disk with signals recorded thereon according to a constant linear velocity method is able to be rotated under control according to a constant angular velocity method. The rotation controller is set free from the control by the operation suspend controller. With this arrangement, the disk continues to rotate even when data writing to the buffer memory is suspended, and, upon resumption of a signal reading from the desk, signal processing is promptly carried out to a signal read from the disk, irrespective of the radial dimension of the point from which the signal was read on the disk.

9 Claims, 3 Drawing Sheets

| | A { | | | A { | | | B { | | C { |
| --- | --- | --- | --- | --- | --- | --- | --- | --- | --- |
| | LD | HEAD SERVO | MOTOR SERVO | RF | DSP (EXCL. CIRC) | CIRC | HEADER MONITOR | ECC EDC |
| FIRST OPERATION MODE | ○ | ○ | ○ | ○ | ○ | ○ | ○ | ○ |
| SECOND OPERATION MODE | × | × | ○ | × | × | × | × | × |
| THIRD OPERATION MODE | ○ | ○ | ○ | ○ | ○ | × | × | × |
| FOURTH OPERATION MODE | ○ | ○ | ○ | ○ | ○ | ○ | ○ | × |

○ : ON , × : OFF

Fig. 2

DISK PLAYER FOR PERFORMING DATA REPRODUCTION RECORDED ON A DISK

BACKGROUND OF THE INVENTION

1. Field of the Invention

The present invention relates to a disk player in which reproduced data obtained by performing reproduction processing on a signal read from a disk, is stored in a buffer memory prior to a request for the data reproduction.

2. Description of the Related Art

Conventional disk players may play a disk which records computer data so that the disk is used as computer ROM for a host computer. CD-ROM drives are common examples of such apparatuses.

Such CD-ROM disk players comprise a buffer memory for the temporary storage of reproduced data read from a disk.

Data following the data requested by a host computer's read command is sequentially read from a disk and reproduced in the same order as the data was recorded on the disk, prior to receipt of read commands for those data, and then cumulatively stored in the buffer memory.

When a sequential read command is issued, and it is confirmed that the requested reproduced data is data stored in the buffer memory, the requested reproduced data is transferred to the host computer. In this case, the command can be executed at a high speed because it is unnecessary to read data from a disk.

Here, in such CD-ROM players, the disk driving speed is generally set faster than the rated speed, and thereby the transfer bit rate for the reproduced data, i.e., the rate at which reproduced data is written into a buffer memory, is set faster than the reading rate at which reproduced data is read from the buffer memory.

In such disk players, in which the writing rate with respect to the buffer memory is set faster than the reading rate, it is possible to reread data from the disk when reproduced data can not be properly obtained, to achieve continuous output by taking advantage of the difference between the write and read rates with respect to the buffer memory.

In such disk players, when data must be read again from a disk due to, for example, the buffer memory overflowing or failed data reproduction, an access operation must be done to search for a needed signal and, until the access operation is completed, an optical head, a servo system circuit, and certain circuits in a read signal reproduction circuit system must operate, in which the optical head is necessary for an access operation, the servo system circuit is required for disk driving, and the certain circuits includes the circuits responsible for the processing until decoding of an address indicative of a reproduction position on the disk, in read signal reproduction processing. However, an error correction circuit, located downstream of the address decoding in the read data reproduction circuit system, need not operate at this point. Moreover, in the case of a CD-ROM player, a CD-ROM signal processing circuit, which carries out signal processing unique to CD-ROM data, also need not operate at this point.

Meanwhile when reproduction of a signal read from a disk is unnecessary because some data remain in the buffer memory, the data in the buffer memory may be read for output. In such a case, the optical head servo system circuit and a read signal reproduction circuit system need not operate.

In conventional disk players, such as is disclosed in JPA Hei 6-96520, a data reading means suspends operation when a buffer memory overflows, and remains at rest until the data in the buffer memory is reduced to within a predetermined level, to thereby save power consumption. Another similar power save type disk player is disclosed in JPA Hei 5-258460.

In the above conventional disk players, a reproduction circuit system, a spindle motor, an optical head, and a servo circuit are collectively handled as a single data reading means, wherein the reproduction circuit system reproduces the signals read from a disk to generate reproduced data, and the servo circuit controls the above circuits. That is, the operations of these circuits are controlled as a whole.

As a result, time is required to activate the spindle motor and bring disk rotation to a predetermined speed when the data reading means resumes operation. This delays the resumption of operation of the data reading means and subsequent data reproduction. This, in turn, leads to a problem such that a period in which the data reading means remains inoperative must be reduced.

In particular, with a disk player for a disk, such as a CD, with signals recorded according to a constant linear velocity method, rotation control cannot be achieved once reading of a recorded signal from the disk is stopped as rotation control is carried out using a signal read from the disk. This results in requiring an even longer time for data reproduction.

Here, when it comes necessary to reread signals from a disk, and an access operation is applied to determine a reading position on the disk, an address recorded in the disk must be demodulated. Presently, commercially available general disk players have a structure in which address demodulation is applied prior to error correction, which is one step in data reproduction.

Power consumption of an error correction circuitry section is generally relatively larger than that of other circuitry sections in a reproduction circuit system. In the above described disk players, an error correction circuitry section [a decoding section of a CIRC (Cross Interleave Read-Solomon Code)] is included in the data reading means, and therefore continues to operate during an access operation period in which data reproduction is not possible, while only consuming a negligible amount of power.

SUMMARY OF THE INVENTION

The present invention has been conceived to overcome the above problems and aims to provide a disk player which performs data reproduction, including read data correction, in synchronism with a bit clock, while controlling the rotation of a disk where signals are recorded according to a constant linear velocity method, using a constant angular velocity method. In this disk player, a rotation control circuit for carrying out rotation control for a disk, using a constant angular velocity method, is controlled independently of a head control circuit for controlling a head which reads a signal from a disk, such that the head is placed in a condition allowing signal reading from a disk, and a reproduction circuit system for reproducing the read signal to generate reproduced data to be stored in a buffer memory. Specifically, an operation suspend controller controls the operations of the head control circuit and the reproduction circuit system, but not that of the rotation control circuit.

With the above arrangement, in which the rotation of a disk with signals recorded in accordance with a constant linear velocity method is controlled using a constant angular velocity method, and the operation of the rotation control circuit is free from the control by the operation suspend controller so that the disk can continue to rotate, the disk can continue to rotate even while data writing to the buffer memory is stopped. Therefore, when signal reading from a disk is resumed, signal processing can promptly be performed to the read signals, regardless of the radial dimension of the reading position on the disk. This can reduce the transitional period to an access operation for reading a desired signal.

According to the present invention, the circuits involved in data reproduction processing, including error correction, with respect to the read data are controlled to suspend operation when writing to a buffer memory is halted, and to remain suspended until disk accessing begins again. During the period from beginning to completion of disk accessing, suspension of operation of the circuits responsible for data reproduction immediately before data correction is released, while the circuits responsible for data reproduction processing after data correction remain suspended.

With the above arrangement, in which circuitry sections irrelevant to data reading from the buffer memory are handled by a smaller unit, power consumption can be efficiently reduced.

According to another aspect of the present invention, when the operation suspend controller releases suspension of operation of the reproduction circuit system, the focus controller outputs a focus control signal indicative of a DC voltage level stored in a level storing section, so that, when signal reading is resumed, the light beam is focused in a condition similar to its average condition at a time when focus control was carried out, immediately before data reproduction was suspended. This allows smooth transition to a focus servo state and, as a consequence, smooth signal reading.

According to yet another aspect of the present invention, information on the last demodulated address is stored in the address demodulator, and, when re-reading from the disk is necessary, the stored information concerning the latest address is used in an access operation carried out with respect to the disk to determine a reading position on the disk.

Specifically, when the disk is accessed for rereading, while using the stored address information as a target address, a signal for a block which contains the data last written in the buffer memory, can be read again from the disk. In this manner, data can be reliably reproduced without the last data written being lost.

According to still another aspect of the present invention, when the amount of data in the buffer memory falls below a predetermined level, disk accessing is resumed to reread data from the disk. By controlling such that only reading from the buffer memory is performed until the data residual amount falls below a predetermined value, it is possible to supply additional data before the buffer memory is emptied. Thus, power consumption of the device can be easily reduced while maintaining maximum performance interms of data reproduction speed or other factors.

BRIEF DESCRIPTION OF THE DRAWINGS

The above and other objects, features, and advantages of the present invention, will become further apparent from the following description of the preferred embodiment taken in conjunction with the accompanying drawings wherein:

FIG. 2 is a diagram explaining the operative and inoperative states of the circuits in respective operation modes of a player as illustrated in FIG. 1.

DESCRIPTION OF THE PREFERRED EMBODIMENTS

Figure 1:
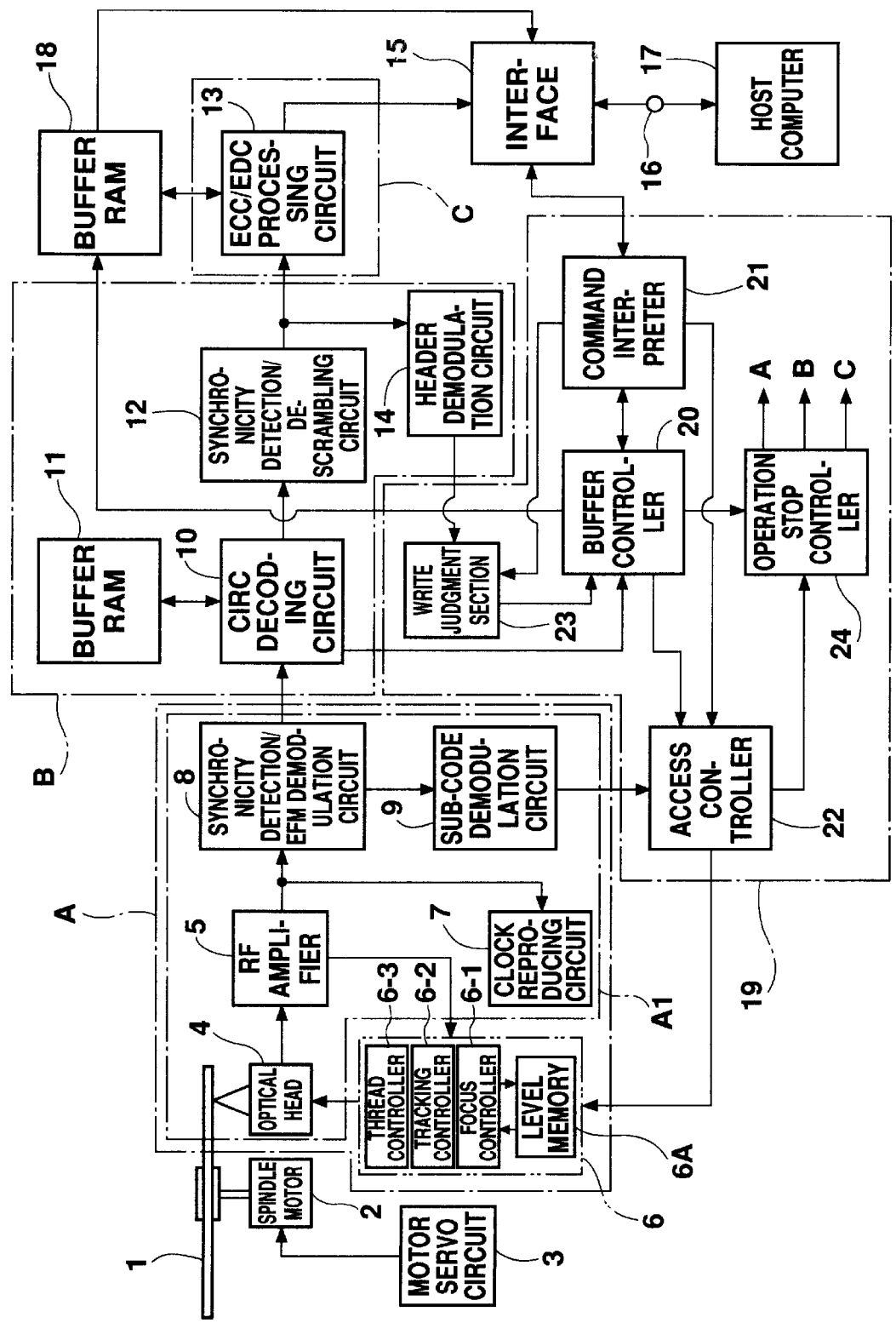
FIG. 1 is a block diagram showing a CD-ROM disk player according to a preferred embodiment of the present invention.

FIG. 1 is a block diagram showing a disk player capable of handling a CD-ROM disk according to a first preferred embodiment of the present invention.

FIG. 1 shows a CD-ROM disk 1, a spindle motor 2, and a motor servo circuit 3. The spindle motor 2 drives the CD-ROM disk 1 for rotation; the motor servo circuit 3 controls the driving of the spindle motor 2.

The motor servo circuit 3 drives a ROM disk 1 adapted to a constant linear velocity method by means of a constant angular velocity method, and is capable of driving a CD-ROM disk 1 at a high speed, on the order of a maximum of a few ten times that of a rated speed.

An optical head 4 irradiates a laser reading beam to therewith trace disk 1 for reading a digitally recorded signal therefrom. An RF amplifier 5 amplifies and binarizes an RF signal (a high frequency signal) to generate an EFM (eight-to-fourteen modulation) signal, the RF signal being obtained by reading, via the optical head 4, a digitally recorded signal from the CD-ROM disk 1. A head servo circuit 6, acting as a head control circuit, includes a focus controller 6-1, a tracking controller 6-2, and a thread controller 6-3. The focus controller 6-1 feeds back an output of the optical head 4 via the RF amplifier 5 to generate a focus control signal for causing the reading beam from the optical head 4 to follow the signal face of the CD-ROM disk 1 and to come into focus thereon. The tracking controller 6-2 generates a tracking control signal for causing the reading beam to follow the signal track on the disk 1. The thread controller 6-3 generates a thread control signal for moving the optical head 4 in a radius direction of the CD-ROM disk 1.

The head servo circuit 6 also has a level storing section 6a for storing a DC voltage level of a focus control signal generated by the focus controller 6-1.

A clock reproduction circuit system 7 comprises a PLL circuit and reproduces a bit clock contained in an EFM signal output from the RF amplifier 5.

A synchronicity detection/EFM demodulation circuit 8 detects a frame synchronous signal indicative of the top of a frame, from an EFM signal, and gives EFM demodulation to the EFM signal. A sub-code demodulation circuit (an address demodulation circuit) 9 separates a sub-code signal, which is address information indicative of a reading position, from the data generated by the synchronicity detection/EFM demodulation circuit 8, and demodulates the sub-code signal. A CIRC decoding circuit 10 decodes a CIRC, which is an error code of the data generated by the synchronicity detection/EFM demodulation circuit 8. A buffer RAM 11 is used as a buffer for rearrangement of and error correction for the data generated by the synchronicity detection/EFM demodulation circuit 8.

A synchronicity detection/de-scrambling circuit 12 detects synchronicity of CD-ROM data output from the CIRC decoding circuit 10, and de-scrambles the CD-ROM data. An ECC/EDC processing circuit 13 performs ECC (error correction code) and EDC (error detection code) signal processing to detect and correct errors unique to the CD-ROM data supplied from the synchronicity detection/de-scrambling circuit 12. A header demodulation circuit 14 demodulates a header address contained in CD-ROM data.

The circuits for data reproduction using an EFM signal, i.e., from the synchronicity detection/EFM demodulation circuit 8 to the ECC/EDC processing circuit 13, the sub-code demodulation circuit 9, and the header demodulation circuit 14 operate in response to an operation clock which is a bit clock reproduced by the clock reproducing circuit 7. That is, these circuits all operate in synchronism with a bit clock, and data reproduction is achievable with enlarged tolerance with respect to the variation of a disk driving speed.

An interface 15 makes an adjustment with respect to a host computer 17, which is externally connected via a connection terminal 16. A buffer RAM 18 stores reproduced data which is used in digital signal processing by the synchronicity detection/de-scrambling circuit 12 and the ECC/EDC processing circuit 13, and is also output to the host computer 17. A control microcomputer 19 controls respective circuits for data reproduction, the interface 15, and the buffer RAM 18.

The control microcomputer 19 comprises a buffer controller 20, a command interpreter 21, an access controller 22, a write judgment section 23, and an operation suspend controller 24. The buffer controller 20 controls data writing and reading with respect to the buffer RAM 18 such that data is written in synchronism with a bit clock and read in synchronism with a reference clock with quartz oscillation accuracy. The command interpreter 21 interprets a read command via which the host computer 17 requests data recorded in the CD-ROM disk 1. The access controller 22 controls an access operation, in which a reading position from which the optical head 4 reads a signal on the disk 1 is adjusted for the search for a target address in accordance with the data requested via the read command interpreted by the command interpreter 21 and with the amount of data then stored in the buffer RAM 18. The write judgment section 23 stores a header address from immediately before the discontinuation of data writing to the buffer RAM 18, and determines, based on a detected header address, whether or not to resume data writing to the buffer RAM 18. The operation suspend controller 24 controls suspension of operation of the head servo circuit 6 and the read signal reproduction circuit system in response to the discontinuation of data writing into the buffer RAM 18 by the buffer controller 20, and the execution of an access operation by the access controller 22 for the search for a target address on the CD-ROM disk 1.

With a thus configured disk player, when reading a signal from the disk 1 for execution of a read command supplied from the host computer 17, the access controller 22 searches a point on the disk 1 corresponding to a target address, which is then the address designated by the read command, based on time information data obtained from a sub-code Q signal, and then reads a signal in block units therefrom concerning the desired data requested via the read command.

In the above case, until completion of a target address search, sub-code signal separated by the synchronicity detection/EFM demodulation circuit 8 must continue to be demodulated by the sub-code demodulation circuit 9 so that sub-code Q signals continue to be decoded. However, data reproduction processing by the circuits belonging to Blocks B and C in FIG. 1, namely those from the CIRC decoding circuit 10 to the ECC/EDC processing circuit 13, is unnecessary. Therefore, according to the present invention, these circuits do not execute above mentioned data reproduction processing until a target address search is completed.

When the target address search is completed, data reproduction processing by the circuits from the CIRC decoding circuit 10 to ECC/EDC processing circuit 13 must be performed. That is, the CIRC decoding circuit 10 gives error correction to the data demodulated by the synchronicity detection/EFM demodulation circuit 8; the synchronicity detection/de-scrambling circuit 12 detects synchronicity of CD-ROM data and de-scrambles the data; and the ECC/EDC processing circuit 13 conducts ECC and EDC processing to the descrambled data, whereby original data is reproduced.

The header demodulation circuit 14 demodulates a header address contained in the CD-ROM data. With reference to the demodulated header address, the data requested via a read command is extracted in block units from the reproduced data. The extracted data is then transferred to the host computer 17 via the interface 15.

Unless data writing is halted, the reproduced data is sequentially written in block units into the buffer RAM 18 before being transferred to the host computer 17, until the buffer RAM 18 overflows, beginning with the data block immediately following the block requested via the read command. In this manner, signals are read from the disk 1, prior to receipt of read commands for these signals, to be reproduced and stored in the buffer RAM 18.

When the buffer RAM 18 is full, or when data reproduction cannot be properly performed as an error correction disable flag C2 indicative of unsuccessful error correction is generated by the CIRC decoding circuit 10, the buffer controller 20 halts data writing to the buffer RAM 18.

Data writing to the buffer RAM 18 remains suspended until the data in the buffer RAM 18 is reduced below a predetermined data storage level.

Once the data in the buffer RAM 18 is reduced to below a predetermined data storage level, the access controller 22 begins an access operation so as to read again from the disk 1 a signal for a block with the data last written into the buffer RAM 18. Here, when the sub-code demodulation circuit 9 demodulates a sub-code Q signal, the last demodulated sub-code Q signal is stored. Thus, an access operation is carried out using the stored sub-code Q signal as a target address, so that a signal concerning a block containing the data last written in the buffer RAM 18 can be re-read from the CD-ROM disk 1.

When a target address search is completed, reproduction processing is performed on the read signal from the disk 1 by the CIRC decoding circuit 10 and downstream circuits in the reproduction circuit system, and a header address in the reproduced data is demodulated by the header demodulation circuit 14. When the write judgment section 23 detects a header address corresponding to the data last written into the buffer RAM 18, data writing to the buffer RAM 18 is resumed so that the data following the last written data is written such that header addresses become successive.

Here, the operation suspend controller 24 controls suspension of operation of the head servo circuit 6 and the read signal reproduction circuit system, with reference to the buffer controller 20 halting data writing into the buffer RAM 18 and the access controller 22 carrying out an access operation.

Specifically, the operation suspend controller 24 controls the starting or suspending of the operations of the circuits grouped as Block A, those as Block B, and that as Block C. Block A includes the circuits used for detection of an address which is necessary for an access operation. Block B (a second circuit block) includes the circuits used for data reproduction processing after EFM demodulation. Block C includes the ECC/EDC processing circuit 13. More specifically, Block A includes the head servo circuit 6 and a first circuitry block A1, which includes a laser diode LD, acting as a light source of the optical head 4, the RF amplifier 5, the clock reproducing circuit 7, the synchronicity detection/EFM demodulation circuit 8, and the sub-code demodulation circuit 9. Block B includes the CIRC decoding circuit 10, the buffer RAM 11, the synchronicity detection/de-scrambling circuit 12, and the header demodulation circuit 14.

Operation of the synchronicity detection/EFM demodulation circuit 8, the sub-code demodulation circuit 9, and the circuits in Block B, all of which operate in response to a bit clock reproduced by the clock reproducing circuit 7, is halted by suspending the bit clock supply. The optical head 4, the RF amplifier 5, the head servo circuit 6, and the clock reproducing circuit 7 are controlled to stop operating by stopping a power supply.

Next described with reference to FIG. 2 will be various operation modes in which circuits operate while executing a command from the host computer 17.

Operation modes include first, second, third, and fourth modes. In the first mode, reproduced data are written into the buffer RAM 18. In the second mode, data writing into the buffer RAM 18 is stopped, and an access operation is not operated. In the third mode, an access operation is performed for the search of a sub-code Q signal for use as a target address. In the fourth mode, a header address demodulated by the header demodulation circuit 14 is monitored to detect a timing at which to resume data writing into the buffer RAM 18. The operation suspend controller 24 controls the suspending or starting of the operations of these circuits, depending on the operation modes.

Here, once the buffer RAM 18 overflows and data writing thereinto is stopped, data writing to the buffer RAM 18 remains suspended until the amount of data in the buffer RAM 18 is reduced to below a predetermined data storage level. An access operation is not carried out. The operation mode is shifted to the second operation mode.

Alternatively, when CIRC decoding circuit 10 generates an error correction disable flag C2, indicating the failure of proper data reproduction, data writing to the buffer RAM 18 is stopped. Then, the buffer controller 20 detects whether or not the amount of data in the buffer RAM 18 is below the predetermined data storage level. When it is not, the operation mode shifts to the second operation mode.

When, on the other hand, the amount of data is below that level, the operation mode shifts to the third operation mode, so that an access operation is conducted, and rereading of a signal corresponding to the data which was not properly reproduced, is carried out.

The data storage level is determined in advance with consideration of a required disk re-reading time such that an appropriate amount of data is left in the buffer memory, and used as a reference for the buffer controller 20 to resume data writing to the buffer RAM 18.

In the second operation mode, in which data writing into the buffer RAM 18 is halted and an access operation is not operated, the operation suspend controller 24 suspends operation of the circuits in Blocks A, B, and C. As a result, these circuits then consume no power, further reducing power consumption.

In the second operation mode, as the interface 15, the buffer RAM 18, and the control microcomputer 19 are kept operating, when the data requested by a read command from the host computer 17 is data stored in the buffer RAM 18, that data is read from the buffer RAM 18 and transferred via the interface 15 to the host computer 17.

Therefore, for a sequential reading, a request for data in the same order in which the data is recorded in the disk 1, the data stored in the buffer RAM 18 can be supplied from the buffer RAM 18.

Thereafter, when the data in the buffer RAM 18 is reduced to below a predetermined level, the access controller 22 begins an access operation, and the operation mode shifts to the third operation mode.

Alternatively, when it is determined that the data requested by the read command from the host computer 17 is data which is not stored in the buffer RAM 18, all data in the buffer RAM 18 is deleted, and access controller 22 begins an access operation, so that the operation mode shifts to the third operation mode.

In the third operation mode, the operations of the circuits in Block A resume as directed by the operation suspend controller 24, while Blocks B and C remain suspended. Accordingly, a signal recorded on the disk 1 is read by the optical head 4, and the access controller 22 starts an access operation to search a sub-code Q signal for use as a target address.

When the data amount in the buffer RAM 18 is fallen below the predetermined level by reading the data in the buffer RAM 18, an access operation is carried out to read a signal concerning the block containing the data last written in the buffer RAM 18. On the other hand, when it is determined that the data requested by the host computer 17 is data which is not stored in the buffer RAM 18, an access operation is carried out to read a signal concerning a block containing the data requested by the read command.

As operation of the circuits in Blocks B and C remains suspended due to the operation suspend controller 24 during an access operation period, power consumption of the respective circuits can be reduced.

When a target address search is completed, suspension of the operations of the circuits in Block B is released by the operation suspend controller 24, but the operation of the ECC/EDC processing circuit 13 belonging to Block C remains suspended. Therefore, the signal read from the disk 1 is reproduced by the CIRC decoding circuit 10 and downstream circuits in a reproduction system circuit, and the header address of the reproduced data is demodulated by the header demodulation circuit 14. The operation mode shifts to the fourth operation mode, in which the demodulated header address is monitored for determination of a timing at which to resume data writing to the buffer RAM 18.

When the header address corresponding to the data last written into the buffer RAM 18 or to the data requested by a read command is demodulated, the write judgment section 23 makes a decision to start data writing to the buffer RAM 18.

With the decision to start data writing to the buffer RAM 18, the operation suspend controller 24 releases suspension of operation of the circuit in Block C, namely, the ECC/EDC processing circuit 13, so that the operation mode shifts to the first operation mode, in which data writing to the buffer RAM 18 is resumed.

As described above, in the circuit shown in FIG. 1, operation of the circuitry sections not relevant to data reading from the buffer RAM 18 is controlled in a smaller block unit than the conventional design. This allows efficient saving of power consumption.

Here, in the second operation mode, rotation of the disk 1 is controlled, even when signal reading from the disk 1 is halted.

In such a case, since all data reproduction processing until data writing into the buffer RAM 18 is performed in synchronism with a bit clock, and because a disk with signals recorded thereon according to a constant linear velocity means can be driven using a constant angular velocity method, when the operation mode is shifted to the third operation mode by driving the disk 1 using a constant angular rate, and signal reading from the disk 1 is resumed, the read signal can be promptly processed irrespective of the radial dimension of the point from which the signal was read on the disk 1. This can reduce the time required between shifting to the third operation mode and actual execution of an access operation.

Also, the DC voltage level of a focus control signal generated by the focus controller 6-1 of the head servo circuit 6 immediately before the operation of the reproduction circuit system is suspended by the operation suspend controller 24, is stored in the level storing section 6a, and the stored DC voltage level is sent as a focus control signal by the focus controller 6-1 when the suspension of operation of the reproduction system circuit is released by the operation suspend controller 24.

Therefore, when the operation mode shifts to the third operation mode, in which irradiation of a laser diode by the optical head 4 is begun and focus and tracking control of the optical head 4 is started, the focal position of the light beam from the optical head 4 is brought into the average condition at the time immediately before the discontinuation of reproduction, when focus control was carried out, which is near the end of the first operation mode. Thus, in general, it is possible to promptly shift to a focus servo state.

As a result, the time period after shifting to the third operation mode and before establishing a condition allowing signal reading from a disk, can be shortened.

Figure 3:
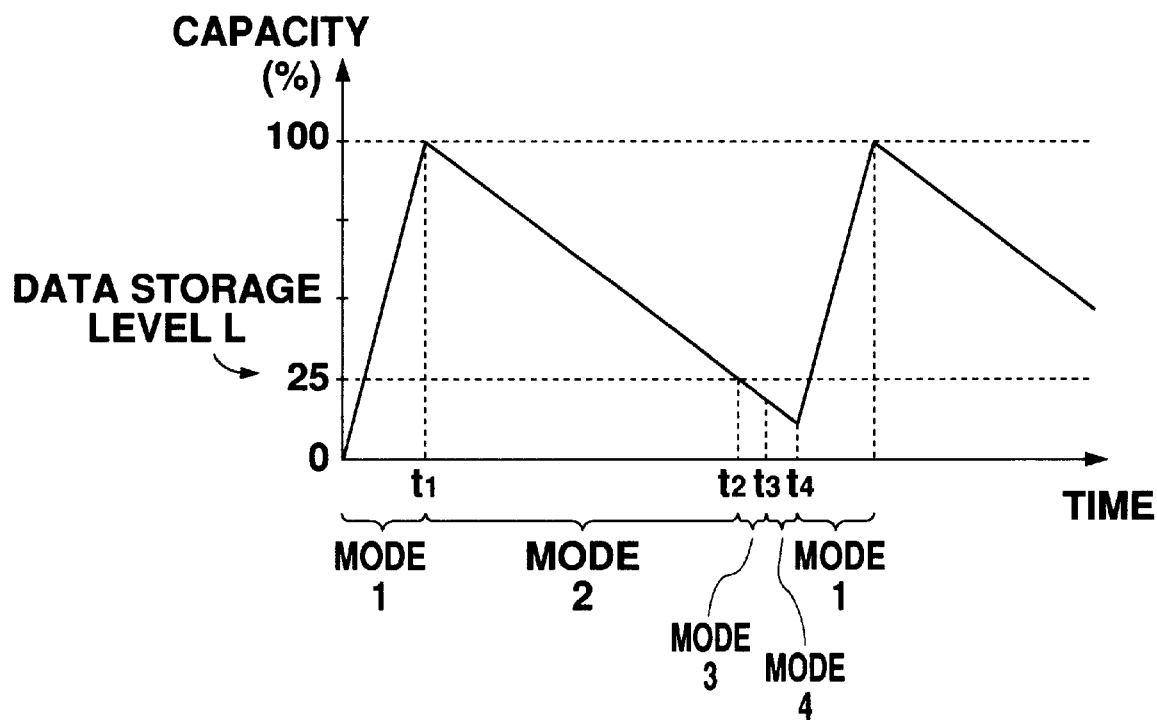
FIG. 3 is a diagram illustrating the variation of the amount of data stored in the buffer RAM 18 in an arrangement in which operation modes shift according to the amount of data stored in the buffer RAM 18.

FIG. 3 is a diagram explaining the varying amounts of data left in the buffer RAM 18 in an arrangement in which the shift of operation modes depends on the amount of data in the buffer RAM 18.

The operation mode shifts from the first operation mode (Mode 1), in which data is written into the buffer RAM 18, to the second operation mode (Mode 2) at time t1, when the buffer RAM 18 overflows, so that data writing to the buffer RAM 18 is stopped and only data reading is carried out.

The operation mode further shifts at time t2, when the amount of data in the buffer RAM 18 is reduced below the data storage level L, to the third operation mode (Mode 3), so that the access controller 22 starts an access operation.

The operation mode further shifts at time t3, when a target address search is completed through an access operation using a sub-code Q signal, to the fourth operation mode (Mode 4), so that header addresses are monitored for determining a timing at which data writing to the buffer RAM 18 is resumed.

The operation mode further shifts to the first operation mode at time t4, when the timing at which to resume data writing to the buffer RAM 18 is determined, so that data writing to the buffer RAM 18 is resumed.

The buffer RAM 18 may be a DRAM with a 4M bytes storing capacity. The data storage level L is set, for example, at 1M bytes as a level at which the data inherent in a CD-ROM can be ensured. With such an arrangement, power consumption can be suppressed during a period when the data corresponding to the 3M bytes is being read from the buffer RAM 18, while the performance inherent in a CD-ROM is ensured. In other words, 3M bytes of storing section capacity can be contributed to power consumption reduction.

What is claimed is:

1. A disk player for reproducing a bit clock from read data obtained by reading a signal recorded in a disk according to a constant linear velocity method and binarizing the read signal, carrying out reproduction processing, including data correction, with respect to the read data in synchronism with the bit clock to generate reproduced data, and storing the reproduced data in a buffer memory, the disk player comprising:

a rotation control circuit for controlling the disk so as to rotate at a constant angular velocity;

a head control circuit for controlling a head which reads a signal from the disk, such that the head is placed in a condition allowing signal reading from the disk, wherein the head is an optical head, the head control circuit including a focus controller for controlling a light beam from the optical head so as to come into focus on a signal recording face of the disk and a level storing section for storing a DC voltage level of a focus control signal generated by the focus controller immediately before the operation suspend controller suspends operation of the reproduction circuit, and the focus controller outputs a focus control signal indicative of the DC voltage level stored in the level storing section, when the operation suspend controller releases suspension of operation of the reproduction circuit;

a reproduction circuit for performing reproduction processing to the signal read by the head to generate reproduced data to be stored in the buffer memory;

a buffer controller for controlling writing and reading of the reproduced data with respect to the buffer memory; and an operation suspend controller for suspending operation of the reproduction circuit and the head control circuit when the buffer controller stops writing of the reproduced data into the buffer memory;

the rotation control circuit being free from control by the operation suspend controller.

2. A disk player for obtaining read data by binarizing a signal read from a disk, thereafter carrying out reproduction processing, including error correction, with respect to the read data to generate reproduced data, and storing the reproduced data in a buffer memory, the disk player comprising:

a buffer controller for controlling data writing and reading with respect to the buffer memory;

an operation suspend controller for individually controlling suspending of operation of a first circuitry block and a second circuitry block; and wherein the first circuitry block includes an address demodulator for demodulating disk address information from the read data, and carries out data reproduction processing immediately before data correction with respect to the read data, and a second circuitry block carries out error correction and thereafter data reproduction processing with respect to the read data, wherein the operation suspend controller suspends operation of the first circuitry block and the second circuitry block during a period from stoppage of data writing to the buffer memory until beginning of an access operation with respect to the disk, and releases suspension of operation of the first circuitry block and keeps suspension of operation of the second circuitry block during a period from start to completion of the access operation.

3. A disk player according to claim 2, for irradiating a light beam from an optical head so as to come into focus on a signal recording face of the disk to thereby optically read the signal recorded on the disk, the disk player further comprising a focus controller for controlling the light beam from the optical head so as to come into focus on the signal recording face of the disk, and a level storing section for storing a DC voltage level of a focus control signal generated by the focus controller immediately before the operation suspend controller suspends operation of a circuit for reproduction processing wherein the focus controller outputs a focus control signal indicative of the DC voltage level stored in the level storing section, when the operation suspend controller releases suspension of operation of the circuit for reproduction processing.

4. A disk player according to claim 2, wherein the address demodulator stores information on the latest address demodulated, and, when rereading from the disk is unnecessary, an access operation is carried out with respect to the disk, utilizing the latest address stored, to search for a reading position on the disk.

5. A disk player according to claim 2, wherein the access operation is started with respect to the disk for rereading from the disk when the amount of data stored in the buffer memory is reduced to below a predetermined value.

6. A disk player for reproducing a bit clock from read data obtained by reading a signal recorded in a disk according to a constant linear velocity method and binarizing the read signal, carrying out reproduction processing, including data correction, with respect to the read data in synchronism with the bit clock to generate reproduced data, and storing the reproduced data in a buffer memory, the disk player comprising:

a rotation control circuit for controlling the disk so as to rotate at a constant angular velocity;

a head control circuit for controlling a head which reads a signal from the disk, such that the head is placed in a condition allowing signal reading from the disk;

a buffer controller for controlling writing and reading of the reproduced data with respect to the buffer memory;

a first circuitry block including an address demodulator for demodulating disk address information from the read data, for carrying out data reproduction processing immediately before data correction with respect to the read data read by the head;

a second circuitry block for carrying out error correction and thereafter data reproduction processing with respect to the read data; and an operation suspend controller for individually controlling suspending of operation of the first circuitry block and the second circuitry block, wherein the operation suspend controller suspends operation of the head control circuit, the first circuitry block, and the second circuitry block during a period after stoppage of data writing to the buffer memory until beginning of an access operation with respect to the disk, and releases suspension of operation of the head control circuit and the first circuitry block and keeps suspension of operation of the second circuitry block during a period from start to completion of the access operation, the rotation control circuit being free from control by the operation suspend controller.

7. A disk player according to claim 6, wherein the head is an optical head, the head controller includes a focus controller for controlling a light beam from the optical head so as to come into focus on the signal recording face of the disk, and a level storing section for storing a DC voltage level of a focus control signal generated by the focus controller immediately before the operation suspend controller suspends operation of a circuit for reproduction processing, and the focus controller outputs a focus control signal indicative of the DC voltage level stored in the level storage section, when the operation suspend controller releases suspension of operation of the circuit for reproduction processing.

8. A disk player according to claim 6, wherein the address demodulator stores information on the latest address demodulated, and, when rereading from the disk is unnecessary, an access operation is carried out with respect to the disk, utilizing the latest address stored, to search for a reading position on the disk.

9. A disk player according to claim 6, wherein the access operation is started with respect to the disk for rereading from the disk when the amount of data stored in the buffer memory is reduced to below a predetermined value.

* * * * *